May 23, 1939.  C. C. FARMER  2,159,787
FLUID PRESSURE BRAKE
Filed May 29, 1937
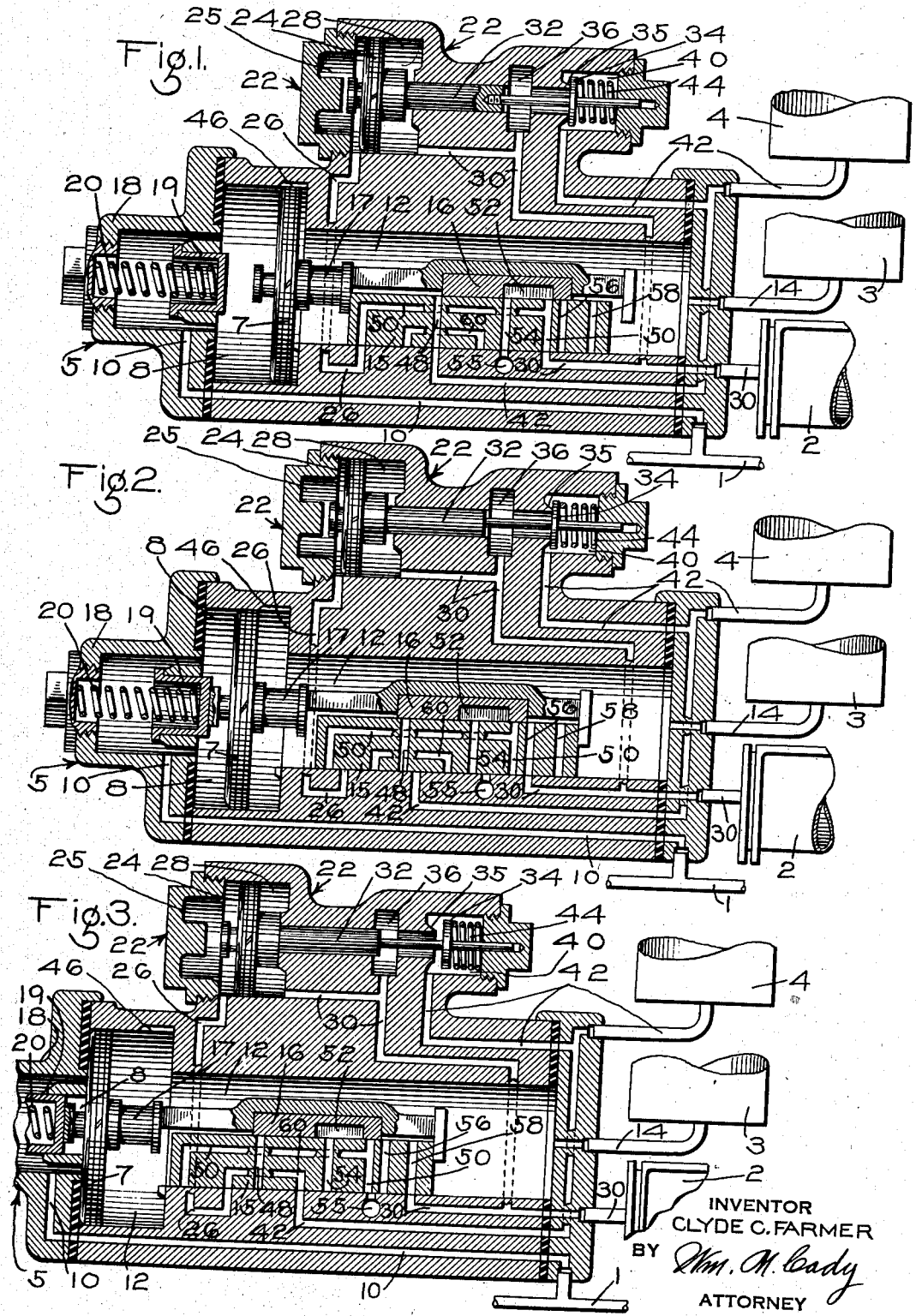
INVENTOR
CLYDE C. FARMER
BY Wm. M. Cady
ATTORNEY Patented May 23, 1939

2,159,787

UNITED STATES PATENT OFFICE 2,159,787

FLUID PRESSURE BRAKE

Clyde C. Farmer, Pittsburgh, Pa., assignor to The Westinghouse Air Brake Company, Wilmerding, Pa., a corporation of Pennsylvania Application May 29, 1937, Serial No. 145,431

10 Claims. (Cl. 303—46)

This invention relates to a fluid pressure brake equipment, and particularly to means for securing a high brake cylinder pressure on an emergency application of the brakes.

It has heretofore been proposed to provide a fluid pressure brake equipment having valve means subject to the opposing pressures of the fluid in the brake pipe and of the fluid in an auxiliary reservoir for supplying fluid from the auxiliary reservoir to the brake cylinder. It has also been proposed to provide in a brake equipment of this type, a supplementary reservoir and a valve device subject to the opposing pressures of the fluid in the brake cylinder and of the fluid in a control chamber for supplying fluid from the supplementary reservoir to the brake cylinder, together with means operated by the valve means on an emergency reduction in brake pipe pressure to supply fluid to the control chamber of the valve device to condition it to supply fluid from the supplementary reservoir to the brake cylinder.

In the construction heretofore provided, the valve means supplies fluid from the auxiliary reservoir to the control chamber of the valve device. After a relatively heavy service application of the brakes there is little differential between the pressures in the auxiliary reservoir and in the brake cylinder, while on a full service application, the pressure of the fluid in the auxiliary reservoir equalizes with that in the brake cylinder.

Accordingly, on movement of the valve means to the emergency position after a relatively heavy or a full service application of the brakes, the fluid supplied from the auxiliary reservoir to the control chamber of the valve device is not effective to cause operation of the valve device to supply fluid from the supplementary reservoir to the brake cylinder, and the desired high brake cylinder pressure is not developed.

It is an object of this invention to provide a brake equipment of the type described, and arranged to supply fluid from the supplementary reservoir to the brake cylinder on an emergency application, irrespective of the degree of brake cylinder pressure developed by service applications of the brakes prior to the emergency application.

A further object of the invention is to provide an improved brake equipment of the type described.

Other objects of the invention and features of novelty will be apparent from the following description taken in connection with the accompanying drawing, in which, Fig. 1 is a diagrammatic view, partly in section, of a brake equipment embodying my invention, the valve means of this equipment being shown in the release position, Fig. 2 is a view similar to Fig. 1, but showing the valve means in the service application position, and Figs. 3 is a view similar to Figs. 1 and 2, but showing the valve means in the emergency application position.

Referring to the drawing, the brake equipment shown therein comprises a brake pipe 1, a brake cylinder 2, an auxiliary reservoir 3, a supplementary reservoir 4, and valve means indicated generally by the reference numeral 5.

The valve means 5 comprises a body having a bore therein in which is mounted a piston 7 having at one side thereof a chamber 8, which is constantly connected with the brake pipe 1 by means of a branch pipe and passage 10.

The piston 7 has at the other face thereof a valve chamber 12 which is constantly connected with the auxiliary reservoir 3 by way of a pipe 14. A main slide valve 15, and an auxiliary slide valve 16 having movement relative to the main slide valve 15 are mounted in the valve chamber 12, and are operated by the piston 7 through the medium of a stem 17.

The valve device 5 has associated therewith a cover section 18 having a bore therein in which is mounted a plunger 19 which is yieldingly urged to the right, as viewed in the drawing, by means of a coil spring 20.

The valve means 5 has associated therewith a valve device indicated generally by the reference numeral 22, and comprising a piston 24 which is mounted in a bore in the body of the valve means 5, and has at one side thereof a chamber 25 which is constantly connected by way of a passage 26 with a port in the seat of the main slide valve 15. The piston 24 has at the other side thereof a chamber 28 which is constantly connected by way of a passage and pipe 30 with the brake cylinder 2, while the brake cylinder 2 is also connected by way of a branch of the passage 30 with a port in the seat of the main slide valve 15.

The piston 24 of the valve device 22 has a stem 32 which is slidable in a bore in the body of the valve means 5, and has a reduced end portion which is adapted to engage a valve 34 which is adapted to seat upon a seat rib 35 surrounding a passage open to a chamber 36 to which is connected a branch of the passage 30.

The valve 34 is mounted in a chamber 40 which is constantly connected by way of a passage 42 with the supplementary reservoir 4, while a branch of the passage 42 is connected with a port in the seat of the main slide valve 15. A spring 44 is mounted in the chamber 40, and yieldingly presses the valve 34 to the seated position to cut off the flow of fluid from the chamber 40 to the chamber 36, and thence to the brake cylinder 2.

In operation, on the supply of fluid under pressure to the brake pipe 1, fluid flows therefrom by way of the passage 10 to the chamber 8 at the face of the piston 7, and moves the piston 7 to the release position, as shown in Fig. 1 of the drawing, in which position communication is opened through the feed groove 46 with the result that fluid under pressure flows from the chamber 8 through the feed groove 46 to the valve chamber 12, and thence by way of the pipe 14 to the auxiliary reservoir 3.

Upon the supply of fluid under pressure to the valve chamber 12, fluid flows therefrom through a port 48 through the main slide valve 15, which in this position of the main slide valve 15 is in registration with the passage 42, so that fluid flows by way of the passage and pipe 42 to the supplementary reservoir 4 to charge this reservoir with fluid under pressure.

In the release position of the main slide valve 15, a port 50 therein is in registration with the passage 30 leading from the brake cylinder 2, while a branch of the port 50 is in registration with the passage 26 leading from the chamber 25 at the face of the piston 24 of the valve device 22. In this position of the auxiliary slide valve 16, a cavity 52 therein establishes communication between the port 50 through the main slide valve 15, and a port 54 therein, which in this position of the main slide valve 15 is in registration with an exhaust passage 55. Accordingly, the brake cylinder 2 and the chamber 25 are connected to the atmosphere, and the brakes are released.

Upon a gradual reduction in brake pipe pressure, the piston 7 is shifted towards the left, as viewed in the drawing, to the position in which it is shown in Fig. 2, first moving the graduating valve 16 so as to close the port 48 in the main slide valve 15, and to uncover the service port 56 in the main slide valve 15. The main slide valve 15 is then moved upon its seat until the service port 56 registers with the passage 30, and then fluid under pressure supplied from the valve chamber 12 and the auxiliary reservoir 3 flows to the brake cylinder 2 to effect a service application of the brakes in the usual manner.

On movement of the main slide valve 15 to the service application position, it blanks the passage 26 leading from the chamber 25 with the result that the chamber 25 at one face of the piston 24 is maintained at atmospheric pressure. On the supply of fluid under pressure to the brake cylinder 2, fluid flows by way of the passage 30 to the chamber 28 at the other face of the piston 24 and exerts force on the piston to move it so that the end of the piston stem 32 is moved away from the valve 34, while the valve 34 is held in the seated position to prevent the supply of fluid from the supplementary reservoir 4 to the brake cylinder 2.

When the pressure of the fluid in the auxiliary reservoir 3 and the valve chamber 12 has been reduced by flow to the brake cylinder 2 to a degree slightly less than the reduced brake pipe pressure, the piston 7 is shifted toward the right, as viewed in the drawing, so that the graduating valve 16 laps the service port 56 in the usual manner.

The brakes may be released by increasing brake pipe pressure so that the piston 7 is shifted to the release position in which the feed groove 46 is opened to permit the supply of fluid from the brake pipe to the valve chamber 12 and the auxiliary reservoir 3 to recharge the auxiliary reservoir, while the brake cylinder 2 is connected to the exhaust passage 55, to release the fluid under pressure present therein, and thereby release the brakes.

Upon a sudden reduction in brake pipe pressure, the piston 7 is shifted to the extreme left to the position in which it is shown in Fig. 3, moving the plunger 19 against the spring 20, while the main slide valve 15 is shifted so that an emergency port 58 registers with the passage 30 to permit fluid under pressure to flow from the auxiliary reservoir 3 to the brake cylinder 2. In the emergency position of the main slide valve 15, a port 60 in the main slide valve 15 establishes communication between the passage 42, leading from the supplementary reservoir 4, and the passage 26, leading to the chamber 25 at the face of the piston 24 of the valve device 22. Fluid under pressure is thereupon supplied from the supplementary reservoir 4 to the chamber 25, and on an increase in the pressure of the fluid in this chamber, the piston 24 is moved against the opposing force of the fluid under pressure in the chamber 28, and moves the valve 34 against the spring 44 away from the seat rib 35 to open a communication through which fluid under pressure supplied from the supplementary reservoir 4 to the chamber 40 flows to the chamber 36, and thence by way of the passage 30 to the brake cylinder 2 until the pressure of the fluid in the supplementary reservoir 4 has substantially equalized with the pressure of the fluid in the auxiliary reservoir 3 and in the brake cylinder 2.

When the pressure of the fluid in the supplementary reservoir 4 has substantially equalized with the pressure of the fluid in the brake cylinder 2, the pressure of the fluid in the chamber 25 and in the chamber 28, which are connected to the supplementary reservoir 4 and to the brake cylinder 2, respectively, will be substantially equal, and the spring 44 will expand and move the valve 34 to the seated position to cut off the further supply of fluid from the supplementary reservoir 4 to the brake 2.

On an increase in brake pipe pressure following an emergency application of the brakes, the piston 7 is returned to the release position and moves the main slide valve 15 and the auxiliary slide valve 16 to the position in which they are shown in Fig. 1 of the drawing, in which position the brake cylinder 2 is connected to the exhaust passage 55 to release fluid under pressure therefrom.

In this position of the main slide valve 15, the chamber 25 is connected to the atmosphere by way of the passage 26, the port 50 in the main slide valve, the cavity 52 in the auxiliary slide valve 16, the port 54 in the main slide valve and the atmospheric passage 55. As a result the fluid in the chamber 25 is reduced to atmospheric pressure and the spring 44 maintains the valve 34 in engagement with the seat rib 35 to prevent the flow of fluid from the supplementary reservoir 4, while the chamber 28 at the other face of the piston 24 reduced to the atmospheric pressure on the release of fluid from the brake cylinder 2.

The brake equipment provided by this invention will operate, on movement of the valve means 5 to the emergency position, to supply fluid from the supplementary reservoir 4 to the brake cylinder 2 irrespective of the pressure previously developed in the brake cylinder 2 as a result of service applications of the brakes.

While the brakes are released, the auxiliary reservoir 3 and the supplementary reservoir 4 are charged with fluid under pressure at the pressure normally carried in the brake pipe 1.

On a full service application of the brakes the pressure of the fluid in the auxiliary reservoir 3 will be reduced from that originally present therein by the flow of fluid to the brake cylinder 2 until the pressure of the fluid in the auxiliary reservoir equalizes with that in the brake cylinder, while fluid at this pressure will be present in the chamber 28 at the face of the piston 24 of the valve device 22 as the chamber 28 is connected with the brake cylinder 2 by way of the passage and pipe 30.

During a service application of the brakes, the pressure of the fluid in the supplementary reservoir 4 is maintained at the pressure originally present therein, and this pressure is substantially higher than that present in the brake cylinder and in the auxiliary reservoir after a relatively heavy service application or on a full service application of the brakes.

If, after a heavy or a full service application of the brakes, there is a further reduction in brake pipe pressure so that the piston 7 and the main slide valve 15 are moved to the emergency application position, the port 60 in the main slide valve 15 will establish communication between the passage 42 and the passage 26 with the result that fluid under pressure will be supplied from the supplementary reservoir 4 to the chamber 25 at the face of the piston 24.

As pointed out above, the pressure of the fluid present in the supplementary reservoir 4 is substantially higher than that present in the chamber 28 at this time, and, as a result, the pressure of the fluid in the chamber 25 will be increased to a value substantially higher than that present in the chamber 28 at the opposite face of the piston 24. The piston 24, therefore, will be moved against the opposing force of the fluid under pressure in the chamber 28, and will move the valve 34 against the spring 44 away from the seat rib 35 to permit fluid under pressure supplied from the supplementary reservoir 4 to flow to the brake cylinder 2 and increase the pressure of the fluid therein.

Fluid under pressure will continue to flow from the supplementary reservoir 4 to the brake cylinder 2 until the pressure of the fluid in this reservoir has substantially equalized with the pressure in the brake cylinder 2 and in the auxiliary reservoir 3, while the pressure in the chambers 25 and 28 at the opposite faces of the piston 24 will also substantially equalize, with the result that the spring 44 will move the valve 34 to the seated position.

It will be seen that the brake equipment provided by this invention incorporates a valve device subject on one side to the pressure of the fluid in a chamber, and subject on the other side to the pressure of the fluid in the brake cylinder, and that on an emergency application of the brakes, fluid under pressure is supplied to the chamber from the supplementary reservoir, with the result that the valve device will always operate to supply fluid under pressure from the supplementary reservoir to the brake cylinder, irrespective of the degree of pressure which has previously been established in the brake cylinder as a result of service applications of the brakes.

While one embodiment of the improved fluid pressure brake equipment provided by this invention has been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a fluid pressure brake equipment, in combination, a brake pipe, a brake cylinder, an auxiliary reservoir, a supplementary reservoir, a valve device subject to the opposing pressures of the fluid in the brake cylinder and of the fluid in a chamber and operative upon an increase in fluid pressure in said chamber for supplying fluid from the supplementary reservoir to the brake cylinder, and valve means subject to the opposing pressures of the fluid in the brake pipe and of the fluid in the auxiliary reservoir and operative upon a reduction in brake pipe pressure for supplying fluid under pressure from the auxiliary reservoir to the brake cylinder and for also supplying fluid under pressure from the supplementary reservoir to said chamber at the pressure carried in said supplementary reservoir.

2. In a fluid pressure brake equipment, in combination, a brake pipe, a brake cylinder, an auxiliary reservoir, a supplementary reservoir, a valve device subject to the opposing pressures of the fluid in the brake cylinder and of the fluid in a chamber and operative upon an increase in fluid pressure in said chamber for supplying fluid from the supplementary reservoir to the brake cylinder, and valve means subject to and operated upon a sudden reduction in brake pipe pressure to supply fluid from the auxiliary reservoir to the brake cylinder, and to supply fluid from the supplementary reservoir to said chamber at the pressure carried in said supplementary reservoir.

3. In a fluid pressure brake equipment, in combination, a brake pipe, a brake cylinder, an auxiliary reservoir, a supplementary reservoir, a valve device subject to the opposing pressures of the fluid in the brake cylinder and of the fluid in a chamber and operative upon an increase in fluid pressure in said chamber for supplying fluid from the supplementary reservoir to the brake cylinder, and valve means subject to and operated on a reduction in the pressure of the fluid in the brake pipe at a service rate to move from a release position to a service application position in which communication is established between the auxiliary reservoir and the brake cylinder, and yielding means opposing further movement of said valve means away from the release position, said valve means being movable against said yielding means on a reduction in brake pipe pressure at an emergency rate to an emergency application position in which communication is established between the auxiliary reservoir and the brake cylinder and in which a communication is also established between the supplementary reservoir and said chamber through which fluid at the pressure carried in the supplementary reservoir may be supplied to said chamber.

4. In a fluid pressure brake equipment, in combination, a brake pipe, a brake cylinder, an auxiliary reservoir, a supplementary reservoir, a valve device subject to the opposing pressures of the fluid in the brake cylinder and of the fluid in a chamber for controlling the supply of fluid from the supplementary reservoir to the brake cylinder, and valve means subject to the opposing pressures of the fluid in the brake pipe and of the fluid in the auxiliary reservoir for controlling the supply of fluid under pressure from the auxiliary reservoir to the brake cylinder, and for also controlling the supply of fluid under pressure from the supplementary reservoir to said chamber at the full pressure carried in said supplementary reservoir, said valve means being also operative to release fluid from said chamber.

5. In a fluid pressure brake equipment, in combination, a brake pipe, a brake cylinder, an auxiliary reservoir, a supplementary reservoir, a valve device subject to the opposing pressures of the fluid in the brake cylinder and of the fluid in a chamber for controlling the supply of fluid from the supplementary reservoir to the brake cylinder, and valve means subject to and operated on a reduction in brake pipe pressure to supply fluid from the auxiliary reservoir to the brake cylinder, and to effect the supply of fluid from the supplementary reservoir to said chamber at the full pressure carried in said supplementary reservoir, said valve means being operative on an increase in brake pipe pressure to release fluid from the brake cylinder and from said chamber.

6. In a fluid pressure brake equipment, in combination, a brake pipe, a brake cylinder, an auxiliary reservoir, a supplementary reservoir, valve means subject to the opposing pressures of the fluid in the brake pipe and in the auxiliary reservoir and operative on an emergency reduction in brake pipe pressure to open a communication through which fluid may flow between the auxiliary reservoir and the brake cylinder, and a valve device subject to the opposing pressures of the fluid in a chamber and of the fluid in the brake cylinder and operative on an increase in the pressure of the fluid in said chamber to open a communication through which fluid may flow from the supplementary reservoir to the communication connecting the auxiliary reservoir and the brake cylinder, said valve means being operative on an emergency reduction in brake pipe pressure to open a communication through which fluid may be supplied from the supplementary reservoir to said chamber at the full pressure carried in said supplementary reservoir.

7. In a fluid pressure brake equipment, in combination, a brake pipe, a brake cylinder, an auxiliary reservoir, a supplementary reservoir, valve means subject to the opposing pressures of the fluid in the brake pipe and in the auxiliary reservoir and operative on an emergency reduction in brake pipe pressure to open a communication through which fluid may flow between the auxiliary reservoir and the brake cylinder, and a valve device subject to the opposing pressures of the fluid in a chamber and of the fluid in the brake cylinder and operative on an increase in the pressure of the fluid in said chamber to open a communication through which fluid may flow from the supplementary reservoir to the communication connecting the auxiliary reservoir and the brake cylinder, said valve means being operative on an emergency reduction in brake pipe pressure to open a communication through which fluid may be supplied from the supplementary reservoir to said chamber at the full pressure carried in said supplementary reservoir, and being operative on an increase in brake pipe pressure to release fluid from said chamber.

8. In a fluid pressure brake equipment, in combination, a brake pipe, a brake cylinder, an auxiliary reservoir, a supplementary reservoir, valve means subject to the opposing pressures of the fluid in the brake pipe and of the fluid in the auxiliary reservoir for controlling the supply of fluid from the auxiliary reservoir to the brake cylinder, a valve device subject to the opposing pressures of the fluid in the brake cylinder and of the fluid in a chamber and operative on an increase in the pressure of the fluid in said chamber to open a communication through which fluid may be supplied from the supplementary reservoir to the brake cylinder concurrently with the supply of fluid from the auxiliary reservoir to the brake cylinder, and means controlled by said valve means for controlling the supply of fluid from the supplementary reservoir to said chamber at the full pressure carried in the supplementary reservoir.

9. In a fluid pressure brake equipment, in combination, a brake pipe, a brake cylinder, an auxiliary reservoir, a supplementary reservoir, valve means subject to the opposing pressures of the fluid in the brake pipe and of the fluid in the auxiliary reservoir for controlling the supply of fluid from the auxiliary reservoir to the brake cylinder, a valve device subject to the opposing pressures of the fluid in the brake cylinder and of the fluid in a chamber and operative on an increase in the pressure of the fluid in said chamber to open a communication through which fluid may be supplied from the supplementary reservoir to the brake cylinder concurrently with the supply of fluid from the auxiliary reservoir to the brake cylinder, and means controlled by said valve means for controlling the supply of fluid from the supplementary reservoir to said chamber at the full pressure carried in the supplementary reservoir, said valve means also controlling the release of fluid under pressure from said chamber.

10. In a vehicle fluid pressure brake equipment, in combination, a brake pipe, a brake cylinder, an auxiliary reservoir, a supplementary reservoir, valve means having a valve chamber open to said auxiliary reservoir, said valve means having a movable abutment subject to the opposing pressures of the fluid in the brake pipe and of the fluid in said valve chamber, means controlled by said abutment for controlling the supply of fluid from the auxiliary reservoir to the brake cylinder, a valve device subject to the opposing pressures of the fluid in the brake cylinder and of the fluid in an operating chamber for supplying fluid from the supplementary reservoir to the brake cylinder, and means controlled by said abutment for supplying fluid from the supplementary reservoir to said operating chamber by way of a communication which by-passes the brake cylinder, the valve chamber and the auxiliary reservoir.

CLYDE C. FARMER.